United States Patent
Ito et al.

(10) Patent No.: US 10,592,997 B2
(45) Date of Patent: Mar. 17, 2020

(54) DECISION MAKING SUPPORT DEVICE AND DECISION MAKING SUPPORT METHOD

(71) Applicants: TOYOTA INFOTECHNOLOGY CENTER CO., LTD., Tokyo (JP); Inter-University Research Institute Corporation Research Organization of Information and Systems, Tokyo (JP)

(72) Inventors: Junichi Ito, Nagoya (JP); Atsushi Ikeno, Kyoto (JP); Kenro Aihara, Tokyo (JP); Susumu Kono, Fuchu (JP)

(73) Assignee: Toyota Infotechnology Center Co. LTD., Tokyo (JP)

( * ) Notice: Subject to any disclaimer, the term of this patent is extended or adjusted under 35 U.S.C. 154(b) by 934 days.

(21) Appl. No.: 15/190,196

(22) Filed: Jun. 23, 2016

(65) Prior Publication Data
US 2016/0379118 A1      Dec. 29, 2016

(30) Foreign Application Priority Data
Jun. 23, 2015   (JP) ................................ 2015-125633

(51) Int. Cl.
*G06Q 50/00*      (2012.01)
*G06Q 10/10*      (2012.01)
(Continued)

(52) U.S. Cl.
CPC ........... *G06Q 50/01* (2013.01); *G06Q 10/101* (2013.01); *G10L 15/00* (2013.01); *G10L 21/0272* (2013.01)

(58) Field of Classification Search
None
See application file for complete search history.

(56) References Cited

U.S. PATENT DOCUMENTS

| 5,774,850 A | 6/1998 | Hattori et al. |
| 7,023,979 B1 | 4/2006 | Wu et al. |
(Continued)

FOREIGN PATENT DOCUMENTS

| JP | 3280825 A | 2/2002 |
| JP | 3280825 A | 5/2002 |
(Continued)

OTHER PUBLICATIONS

Patz et al. ("Applications and extensions of MCMC in IRT: Multiple item types, missing data, and rated responses", TR 670, 1997, pp. 30.*

*Primary Examiner* — Li Wu Chang
(74) *Attorney, Agent, or Firm* — Patent Law Works LLP

(57) ABSTRACT

A decision making support device including: an opinion acquiring module that acquires an expressed opinion from each of a plurality of participants with respect to each of the plurality of selective elements; and a target person determining module that determines, with respect to a given selective element, from which participant an opinion on the selective element is to be elicited when there are a plurality of unexpressed participants who have not yet expressed opinions on the selective element, wherein the target person determining module respectively calculates, when assuming that each of the unexpressed participants has expressed any of expected opinions, assumed group satisfaction that is determined based on contents of decision making and contents of expression of opinions of the plurality of participants, and determines from which participant an opinion on the selective element is to be elicited in consideration of the assumed group satisfaction.

15 Claims, 10 Drawing Sheets

(51) Int. Cl.
*G10L 21/0272* (2013.01)
*G10L 15/00* (2013.01)

(56) References Cited

U.S. PATENT DOCUMENTS

| | | |
|---|---|---|
| 8,494,149 B2 | 7/2013 | Watanabe et al. |
| 9,269,357 B2 | 2/2016 | Itoh et al. |
| 2003/0046554 A1* | 3/2003 | Leydier .............. G06Q 20/3415 713/186 |
| 2008/0256011 A1* | 10/2008 | Rice .................... G06K 9/6231 706/46 |
| 2009/0290689 A1 | 11/2009 | Watanabe et al. |
| 2012/0246222 A1 | 9/2012 | Martin |
| 2015/0287402 A1 | 10/2015 | Okabe et al. |
| 2015/0310877 A1 | 10/2015 | Onishi et al. |
| 2016/0379118 A1 | 12/2016 | Ito et al. |

FOREIGN PATENT DOCUMENTS

| | | |
|---|---|---|
| JP | 2007212532 A | 8/2007 |
| JP | 2009036998 A | 2/2009 |
| JP | 2009036999 A | 2/2009 |
| JP | 2011248549 A | 12/2011 |
| WO | WO2014069076 A8 | 5/2014 |
| WO | WO2014069120 A1 | 5/2014 |

\* cited by examiner

FIG. 5A

CONVERSATION CONTENTS (EXAMPLE)

| TIME | UTTERANCE ID | SPEAKER | CONTENTS (TEXT) OF UTTERANCE |
|---|---|---|---|
| 12:01:01 | 1 | A | LET'S DECIDE WHERE WE WANNA GO FOR LUNCH. |
| 12:01:10 | 2 | B | I'M HUNGRY, SO LET'S FIND A PLACE TO EAT IN *HAKONE YUMOTO*. |
| 12:01:18 | 3 | C | SINCE WE'VE COME THIS FAR, WHY DON'T WE GO TO GOURA AND THEN EAT? |
| 12:01:22 | 4 | B | HMMM, 'A', WHAT DO YOU THINK? |
| 12:01:28 | 5 | A | THERE'S SUPPOSED TO BE THIS GREAT SOBA NOODLE PLACE IN *GOURA*, SO LET'S GO THERE. |

FIG. 5B

ANALYSIS RESULT OF UTTERANCE CONTENTS (EXAMPLE)

| TIME | UTTERANCE ID | SPEAKER | CATEGORY | LOCATION AS CONVERSATION TOPIC | MATTER AS CONVERSATION TOPIC | INTENTION |
|---|---|---|---|---|---|---|
| 12:01:01 | 1 | A | DRINKING AND EATING (LUNCH) | — | — | STARTING CONVERSATION |
| 12:01:10 | 2 | B | DRINKING AND EATING (CUISINE) | HAKONE YUMOTO | — | PROPOSAL |
| 12:01:18 | 3 | C | DRINKING AND EATING (CUISINE) | GOURA | — | NEGATION/ PROPOSAL |
| 12:01:22 | 4 | B | — | — | — | QUESTION |
| 12:01:28 | 5 | A | DRINKING AND EATING (FISH) | GOURA | SOBA NOODLE | CONSENT |

OPINION CONTENTS (EXAMPLE)

| SPEAKER | LOCATION | CONTENTS |
|---|---|---|
| A | GOURA | SOBA NOODLE |
| B | HAKONE YUMOTO | — |
| C | GOURA | — |

FROM WHICH SPEAKER SHOULD OPINION BE ELICITED?

SIMULATION RESULT OF GROUP SATISFACTION (EXAMPLE)

| TARGET | "SOBA NOODLE" | OTHER THAN "SOBA NOODLE" |
|---|---|---|
| B | 0.65 | 0.09 |
| C | 0.20 | 0.09 |

FIG. 8A

CALCULATION OF SCORE OF OPINION STATUS (EXAMPLE)

|  | STATUS OF OPINION | SCORE |
|---|---|---|
| ◎ | SELF-PROPOSED OPINION AND OPINION WAS ADOPTED | 2 |
| ○ | EXPLICITLY CONSENTED TO PROPOSED OPINION AND OPINION WAS ADOPTED | 1 |
| — | NO OPINION | 0 |
| △ | GRUDGINGLY CONSENTED TO PROPOSED OPINION AND OPINION WAS ADOPTED | −1 |
| × | CONSENTED TO OPINION BUT OPINION WAS NOT ADOPTED | −1.5 |
| × × | SELF-PROPOSED OPINION BUT OPINION WAS NOT ADOPTED | −2 |

FIG. 8B

CALCULATION OF GROUP SATISFACTION WITH RESPECT TO OPINION ADOPTION (EXAMPLE)

| PARTICIPANT | SELECTION 1 | SELECTION 2 | SELECTION 3 | OPINION ADOPTION SCORE |
|---|---|---|---|---|
| A | ○ | ◎ | ◎ | 5 |
| B | × × | — | — | −2 |
| C | ◎ | — | — | 2 |

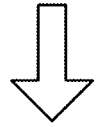

TOTAL: a = 5
VARIATION: b = 27.67

GROUP SATISFACTION
a/b = 0.18

FIG. 9A

CALCULATION OF SCORE OF ACTION RESULT
(PREVIOUS DECISION MAKING) (EXAMPLE)

|  | STATUS REGARDING ACTION RESULT | SCORE |
|---|---|---|
| ◎ | SELF-PROPOSED OPINION WAS ADOPTED AND SATISFIED WITH ACTION RESULT | 2 |
| ○ | ALTHOUGH ANOTHER PERSON'S OPINION WAS ADOPTED, SATISFIED WITH ACTION RESULT | 1 |
| — | NEITHER SATISFIED NOR DISSATISFIED WITH ACTION RESULT | 0 |
| △ | SELF-PROPOSED OPINION WAS ADOPTED BUT DISSATISFIED WITH ACTION RESULT | -1 |
| × | CONSENTED OPINION WAS ADOPTED BUT DISSATISFIED WITH ACTION RESULT | -1.5 |
| × × | OPPOSED OPINION WAS ADOPTED AND DISSATISFIED WITH ACTION RESULT | -2 |

FIG. 9B

CALCULATION OF GROUP SATISFACTION REGARDING
DECISION MAKING RESULT (EXAMPLE)

| PARTICIPANT | PREVIOUS DECISION MAKING (ASSESSMENT OF ACTION RESULT) || CURRENT DECISION MAKING (ASSESSMENT OF OPINION ADOPTION SITUATION) || SCORE |
| | ACTION 1 | ACTION 2 | SELECTION 1 | SELECTION 2 | |
|---|---|---|---|---|---|
| A | × × | — | ○ | ◎ | 1 |
| B | ◎ | — | × × | — | 0 |
| C | ○ | ○ | ◎ | — | 4 |

TOTAL: a = 5
VARIATION: b = 11.67

GROUP SATISFACTION
a/b = 0.43

DECISION MAKING SUPPORT DEVICE AND DECISION MAKING SUPPORT METHOD

CROSS-REFERENCE TO RELATED APPLICATION

This application claims the benefit of Japanese Patent Application No. 2015-125633, filed on Jun. 23, 2015, which is hereby incorporated by reference herein in its entirety.

BACKGROUND OF THE INVENTION

Field of the Invention

The present invention relates to decision-making support when decision making including a plurality of selective elements is performed by a plurality of participants.

Description of the Related Art

In recent years, research and development of techniques for performing various types of interventions such as making proposals and providing support from computers to humans are underway.

Japanese Patent Application Laid-open No. 2007-212532 discloses a technique for extracting contents or a feature of an utterance in a conversation to make an assessment of the utterance. With the technique according to Japanese Patent Application Laid-open No. 2007-212532, for example, a conversation between a customer and an operator at a call center is analyzed in order to assess customer handling skills of the operator including wording used by the operator, customer satisfaction, and whether or not any trouble has occurred.

Japanese Patent Application Laid-open No. 2011-248549 discloses a dialogue device which engages in a dialogue with a user to support decision making by the user. The dialogue device according to Japanese Patent Application Laid-open No. 2011-248549 appropriately supports decision making by a user by dynamically changing information related to knowledge and preferences of the user in accordance with a progress in a dialogue with the user.

While Japanese Patent Application Laid-open No. 2011-248549 describes providing a single user with decision-making support, support for decision making is desirably provided even when a plurality of users exchange opinions in a conversation to make a decision. Japanese Patent Application Laid-open No. 2007-212532 is also intended to assess satisfaction and the like of a single speaker and is not intended to analyze and assess satisfaction of a group as a whole. Decision making by a group is desirably performed without impairing, to the greatest extent feasible, satisfaction of the group as a whole.

In some cases, decision making involves a plurality of selective elements. For example, decision making with respect to a place to eat while traveling includes two selective elements: "where" and "what" to eat. Although satisfaction of an entire group increases when decision making is performed as a consensus of the group, a conflict in opinions often occurs. In particular, a conflict in opinions often occurs when there are a plurality of selective elements.

During decision making, when there is a participant who has not yet expressed an opinion regarding a given selective element, better decision making can be achieved by eliciting an opinion from this participant. When there are a plurality of participants who have yet expressed opinions, there is a problem of which participant an opinion is to be elicited from. While opinions are ideally elicited from all of the participants, since there is no guarantee that opinions can be elicited from all participants due to a time constraint or the like, opinions are desirably preferentially elicited from participants who are highly likely to contribute towards improving group satisfaction. There is also a problem that a person in a vulnerable position in a group is unable to express an opinion or that, even if an opinion is expressed, the opinion is not presented in such a manner that the opinion is adopted.

Moreover, the problems described above are not limited to a conversation agent and apply in general to decision making support devices which support decision making including a plurality of selective elements.

SUMMARY OF THE INVENTION

An object of the present invention is to appropriately determine a priority of participants from which opinions are to be elicited when supporting decision making including a plurality of selective elements in order to enable better decision making.

In order to achieve the object described above, a first aspect of the present invention is a decision making support device that supports decision making including a plurality of selective elements, the decision making support device including: an opinion acquiring unit that acquires an expressed opinion from each of a plurality of participants with respect to each of the plurality of selective elements; and a target person determining unit that determines, with respect to a given selective element, from which participant an opinion on the selective element is to be elicited when there are a plurality of unexpressed participants who have not yet expressed opinions on the selective element. In this case, the target person determining unit respectively calculates, when assuming that each of the unexpressed participants have expressed any of expected opinions, assumed group satisfaction that is determined based on contents of decision making and contents of expression of opinions of the plurality of participants, and determines from which participant an opinion on the selective element is to be elicited in consideration of the assumed group satisfaction.

In this manner, by introducing group satisfaction that is obtained based on the contents of decision making and the contents of expression of opinions and considering assumed group satisfaction when assuming that unexpressed participants have expressed opinions on a given selective element, a participant from which an opinion is to be elicited (that is, a target person) can be appropriately determined.

Expected opinions with respect to a given selective element can include any of the opinions already expressed by any of the participants on the selective element as well as opinions that differ from those already expressed. A new opinion (an opinion not expressed by any participant) conceivably has a same effect on group satisfaction regardless of contents of the opinion. Therefore, carrying out this method enables all possible situations to be assumed when calculating group satisfaction.

In the present invention, contents of decision making when assuming that unexpressed participants have expressed opinions are contents determined according to prescribed criteria in consideration of expressed opinions and assumed opinions with respect to the selective element. As the prescribed criteria, for example, a majority rule by all participants or a majority rule by participants having expressed opinions (including assumed participants) can be adopted. In this case, the majority rule may be a simple majority rule or a majority rule in which a prescribed weight is applied to each participant.

In the present invention, for example, group satisfaction can be calculated based on an opinion adoption score which represents to what degree the opinion of each participant is reflected in the contents of decision making. For example, group satisfaction can be calculated such that, the larger a sum of opinion adoption scores of the respective participants, the higher the group satisfaction, and the smaller a variation among the opinion adoption scores of the respective participants, the higher the group satisfaction. Accordingly, group satisfaction takes a large value when the opinions of the respective participants are evenly reflected in decision making. An opinion adoption score of a participant can be calculated as a sum of scores with respect to respective selective elements. For example, scores for each selective element may be respectively defined in advance for a case where an expressed opinion has been adopted in the contents of decision making and a case where the expressed opinion has not been adopted. Moreover, it is also favorable to divide expression of opinions into cases where an opinion is self-proposed by a participant and cases of consenting to opinions proposed by other participants. In addition, it is also favorable to divide consent into cases where consent is given willingly and cases where consent is given grudgingly.

A specific calculation expression for group satisfaction is not particularly limited. Typically, group satisfaction can be determined so as to be proportional to the sum of the opinion adoption scores of the respective participants and inversely proportional to a variation (proportional to a reciprocal of the variation) among the opinion adoption scores of the respective participants. Alternatively, group satisfaction can be determined as a difference between a sum of opinion adoption scores and a variation among the opinion adoption scores after being multiplied by a prescribed scaling coefficient.

The target person determining unit according to the present invention conceivably determines a target person so that a minimum value of group satisfaction increases. Specifically, the target person determining unit can obtain, for each of the unexpressed participants, a minimum value of assumed group satisfaction when assuming that any of expected opinions is expressed, and when there is an unexpressed participant for which a minimum value of the assumed group satisfaction becomes larger than any of minimum values of assumed group satisfaction of other unexpressed participants, the target person determining unit can determine to elicit an opinion from the unexpressed participant. Accordingly, group satisfaction in a worst-case scenario can be increased.

When there does not exist one unique participant who is relevant to maximizing a minimum value of the assumed group satisfaction, a target person can conceivably be determined so that a maximum value of group satisfaction increases. Specifically, the target person determining unit can also obtain, for each of the unexpressed participants, a maximum value of assumed group satisfaction when assuming that any of expected opinions is expressed, and when an unexpressed participant for which a minimum value of the assumed group satisfaction becomes larger than any of minimum values of assumed group satisfaction of other unexpressed participants does not exist, the target person determining unit can determine to elicit an opinion from an unexpressed participant with a largest maximum value of the assumed group satisfaction. Accordingly, group satisfaction in a best-case scenario can be increased. Moreover, when there are a plurality of participants for which a minimum value of the assumed group satisfaction becomes a maximum, a target person may be determined based on a maximum value of assumed group satisfaction among the plurality of participants.

Moreover, the target person determining unit according to the present invention may determine a target person so that a maximum value of group satisfaction increases to begin with. Specifically, the target person determining unit can obtain, for each of the unexpressed participants, a maximum value of assumed group satisfaction when assuming that any of expected opinions is expressed, and when there is an unexpressed participant for which a maximum value of the assumed group satisfaction becomes larger than any of maximum values of assumed group satisfaction of other unexpressed participants, the target person determining unit can determine to elicit an opinion from the unexpressed participant.

The decision making support device according to the present invention can be configured as a device that intervenes in a conversation. In other words, the opinion acquiring unit according to the present invention can include: an acquiring unit that acquires conversational speech by the plurality of participants; a separating unit that separates an utterance of each participant from the conversational speech; and a recognizing unit that recognizes, from the utterance of each participant, utterance contents using a speech recognition process, and can acquire an opinion of each participant from the conversational speech.

In addition, the opinion acquiring unit and the target person determining unit according to the present invention can be utilized when a type of a group or a group status is determined and when it is determined based on the group type or the group status that an opinion of a participant who has not yet expressed an opinion is favorably elicited. Furthermore, in addition to eliciting an opinion from the participant, support may extend to causing the opinion to be adopted.

The decision making support device according to the present invention may, after determining a target person, directly ask the target person for an opinion by speech reproduction or text display or only provide output indicating that an opinion of the target person is desirably obtained.

Moreover, the present invention can be considered as a decision making support device including at least a part of the unit described above. In addition, the present invention can also be considered as a decision making support method which executes at least a part of the processes performed by the units described above. Furthermore, the present invention can also be considered as a computer program that causes these methods to be executed by a computer or a computer-readable storage unit that non-transitorily stores the computer program. The respective units and processes described above can be combined with one another in any way possible to constitute the present invention.

According to the present invention, a priority of participants from which opinions are to be elicited can be appropriately determined when supporting decision making including a plurality of selective elements in order to enable better decision making.

BRIEF DESCRIPTION OF THE DRAWINGS

FIGS. 5A and 5B are diagrams showing examples of utterances separated for each speaker and for each utterance section;

FIGS. 8A and 8B are diagrams explaining score definitions and calculation examples of group satisfaction; and FIGS. 9A and 9B are diagrams explaining modifications of score definitions and calculation examples of group satisfaction.

DESCRIPTION OF THE EMBODIMENTS

First Embodiment

System Configuration

The present embodiment is a conversation intervention support system which intervenes in a conversation held by a plurality of persons in a vehicle to provide information or support for decision making. The present embodiment is a conversation intervention support system which supports decision making when a plurality of speakers engage in decision making including a plurality of selective elements and, in particular, when there are a plurality of speakers who have not yet expressed opinions on a given selective element, the conversation intervention support system determines from which speaker an opinion regarding the selective element is to be elicited (acquired) and performs an intervention for eliciting the opinion.

Figure 1:
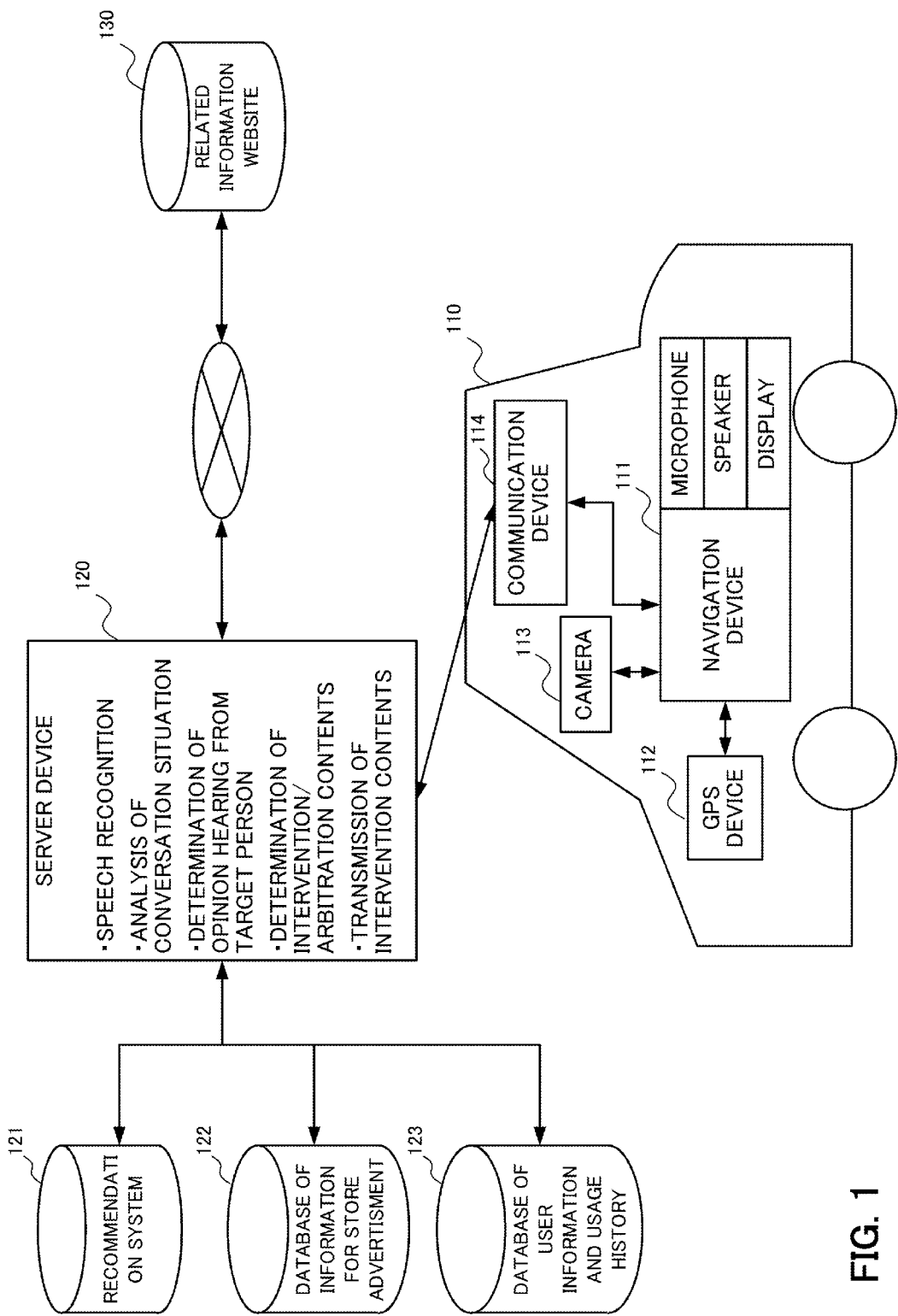
FIG. 1 is a diagram showing a configuration example of a conversation intervention support system according to a first embodiment.

FIG. 1 is a diagram showing a configuration example of a conversation intervention support system according to the present embodiment. Conversational speech of passengers acquired by a navigation device 111 via a microphone is sent to a server device 120 via a communication device 114. The server device 120 analyzes the conversational speech transmitted from a vehicle 110 and performs intervention in the form of providing appropriate information, supporting decision making, or the like in accordance with the situation. The server device 120 analyzes the conversational speech to determine under what kind of policy an intervention is to be performed, and acquires information consistent with the policy from a recommendation system 121, a database 122 of information for store advertisement, and a related information website 130. The server device 120 transmits an intervention instruction to the vehicle 110, and the vehicle 110 performs audio reproduction or displays a text or an image through a speaker or a display of the navigation device 111. In addition, the vehicle 110 is provided with a GPS device 112 which acquires a current position and a camera 113 which photographs the face or the body of a passenger (speaker).

Figure 2:
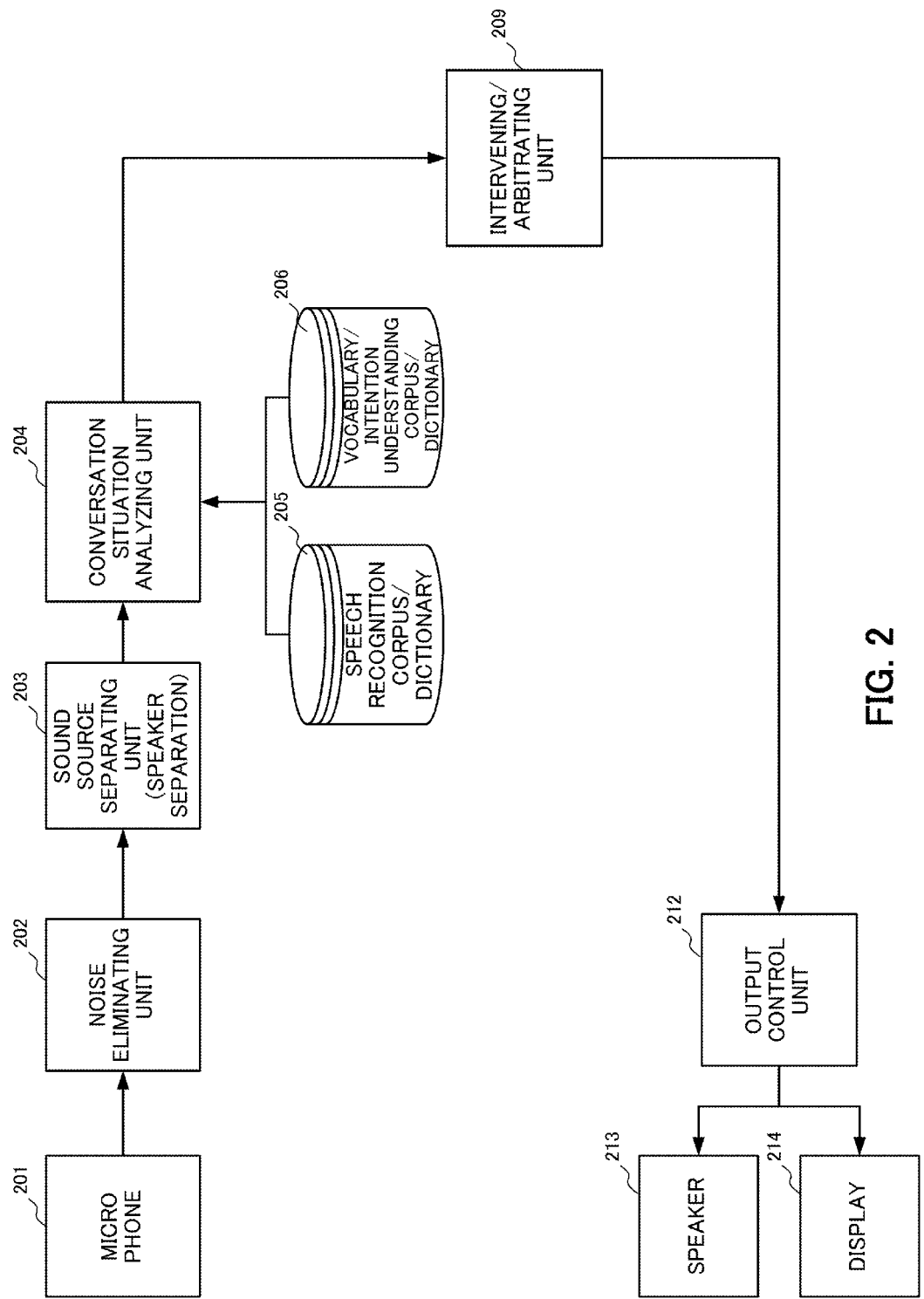
FIG. 2 is a functional block diagram of the conversation intervention support system according to the first embodiment.

FIG. 2 is a functional block diagram of the conversation intervention support system according to the present embodiment. The conversation intervention support system includes a microphone (a speech input unit) 201, a noise eliminating unit 202, a sound source separating unit (a speaker separating unit) 203, a conversation situation analyzing unit 204, a speech recognition corpus/dictionary 205, a vocabulary/intention understanding corpus/dictionary 206, an intervening/arbitrating unit 209, an output control unit 212, a speaker (a speech output unit) 213, and a display (an image displaying unit) 214. Details of processes performed by the respective functional units will be hereinafter described together with the flow charts.

In the present embodiment, among the respective functions shown in FIG. 2, speech input by the microphone 201 and output of intervention contents by the output control unit 212, the speaker 213, and the display 214 are to be performed in the vehicle 110. The other functions are configured to be performed by the server device 120. However, how the functions are shared between the vehicle 110 and the server device 120 is not particularly limited. For example, noise elimination and sound source separation, and even a speech recognition process may be performed in the vehicle 110. Alternatively, all of the functions may be realized inside the vehicle 110.

Moreover, the navigation device 111 and the server device 120 are both computers including a processing device such as a CPU, a storage device such as a RAM and a ROM, an input device, an output device, a communication interface, and the like, and realize the respective functions described above as the processing device executes a program stored in the storage device. However, a part of or all of the functions described above may be realized by dedicated hardware. In addition, the server device 120 need not necessarily be one device and may be constituted by a plurality of devices (computers) connected to one another via a communication line, in which case the functions are to be shared among the respective devices.

<Overall Process>

Figure 3:
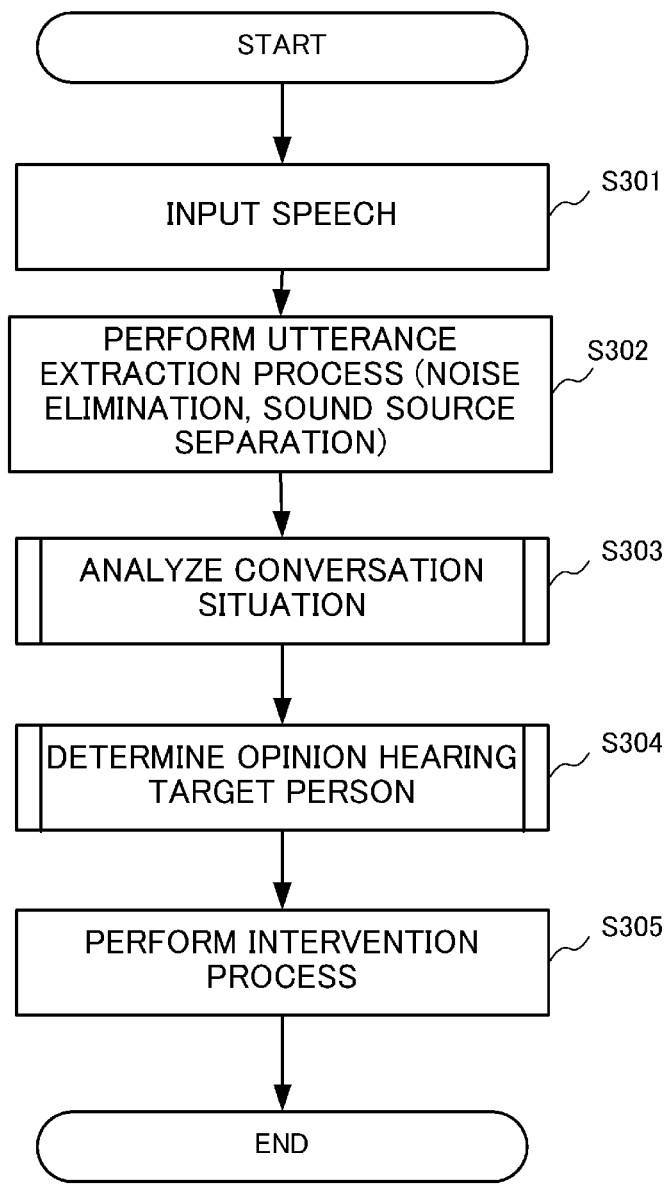
FIG. 3 is a flow chart showing an overall flow of processes in a conversation intervention support method performed by the conversation intervention support system according to the first embodiment.

FIG. 3 is a flow chart showing an overall flow of the conversation intervention support method performed by the conversation intervention support system according to the present embodiment. The conversation intervention support method as a whole will now be described with reference to FIG. 3.

In step S301, the navigation device 111 acquires conversational speech by a plurality of passengers in the vehicle 110 via the microphone 201. In the present embodiment, since subsequent processes on the acquired speech are to be performed by the server device 120, the navigation device 111 transmits the acquired conversational speech to the server device 120 via the communication device 114. Moreover, although the number and arrangement of microphones used are not particularly limited, a plurality of microphones or microphone arrays are favorably used.

In step S302, the server device 120 extracts respective utterances of each speaker from the conversational speech using the noise eliminating unit 202 and the sound source separating unit 203. Moreover, an "utterance" refers to the generation of language in the form of speech as well as speech generated as a result of such generation of language. The process performed at this point includes noise elimination by the noise eliminating unit 202 and sound source separation (speaker separation) by the sound source separating unit 203. The noise eliminating unit 202 specifies and eliminates noise based on, for example, a difference between speech obtained from a microphone arranged near a noise generation source and speech obtained from another microphone. In addition, the noise eliminating unit 202 eliminates noise using a correlation in speech input to a plurality of microphones. The sound source separating unit 203 detects a direction and a distance of each speaker with respect to a microphone based on a time difference between inputs of speech to the plurality of microphones in order to specify a speaker.

In step S303, the conversation situation analyzing unit 204 analyzes a situation of a conversation held by a plurality of persons. In the present embodiment, a conversation is analyzed to determine whether opinions are being coordinated by the conversation and to determine what kind of opinions are being expressed by each speaker. To this end, the conversation situation analyzing unit 204 recognizes a relationship among utterances made by the respective speakers, utterance intentions, and contents of the utterances. Moreover, in a situation where a large number of speakers are present and are split into subgroups respectively engaged in conversations, a group of utterances related to a same conversation may be extracted as a series of a group of utterances based on the contents of the utterances and the relationship among the utterances, in which case a process of an intervention for bridging differences of opinion may be performed on each group of utterances. Specific contents of the process performed by the conversation situation analyzing unit 204 will be described later.

In step S304, in a situation where speakers (participants) of a conversation are engaged in decision making including a plurality of selective elements, the intervening/arbitrating unit 209 determines from which participant an opinion is to be elicited when there are participants who have not expressed opinions on a part of the selective elements. In the present embodiment, as an index representing satisfaction of a group in regards to decision making (group satisfaction), a score is introduced such that the larger the number of adopted opinions of all participants, the higher the score, and the smaller a variation in the numbers of adopted opinions of the respective participants, the higher the score. The intervening/arbitrating unit 209 determines group satisfaction (assumed group satisfaction) when assuming that an expected opinion has been expressed for each of the participants who have not yet expressed opinions on a given selective element and, based on a result of the determination, determines a participant who causes satisfaction of the entire group to increase as an opinion hearing target person (that is, a person whose opinion should be heard and considered). Hereinafter, an "opinion hearing target person" will be also referred to as a "target person". Specific contents of the process performed by the intervening/arbitrating unit 209 will be described later.

In step S306, the intervening/arbitrating unit 209 generates an intervention instruction for eliciting an opinion regarding the selective element from the target person, and the output control unit 212 generates synthesized speech or a text to be output in accordance with the intervention instruction and reproduces the synthesized speech or the text using the speaker 213 or the display 214.

Moreover, there are various conceivable methods of performing an intervention for eliciting an opinion (acquiring an opinion) from the target person. Examples of conceivable methods include directly asking the target person and prompting another participant to directly or indirectly ask what kind of opinion the target person entertains. In addition, it is also favorable to perform a plurality of interventions while changing intervention methods until an opinion is elicited from the target person.

An intervention in a conversation held by a plurality of speakers in the vehicle 110 can be performed as described above. Moreover, the processes presented in the flow chart shown in FIG. 3 are repetitively executed. The conversation intervention support system acquires conversational speech whenever necessary to continuously monitor a conversation situation and a group status, and performs an intervention when it is determined that such intervention is necessary.

<Conversation Situation Analyzing Process>

Figure 4:
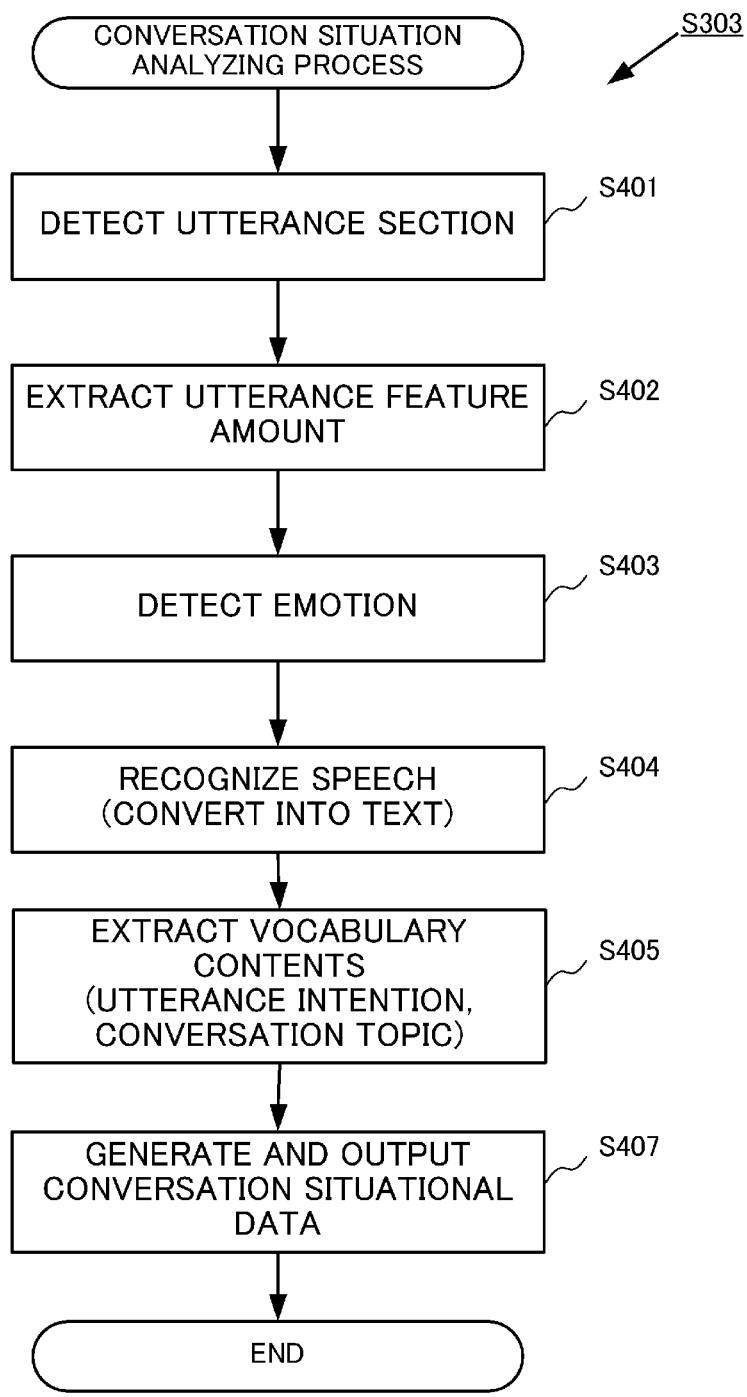
FIG. 4 is a flow chart showing a flow of a conversation situation analyzing process (S303) in a conversation intervention support method.

Next, details of the conversation situation analyzing process in step S303 will be described. FIG. 4 is a flow chart showing a flow of the conversation situation analyzing process. Moreover, the process of the flow chart shown in FIG. 4 need not necessarily be performed in the illustrated sequence and a part of the process may be omitted.

In step S401, the conversation situation analyzing unit 204 detects utterance sections from speech data obtained by sound source separation and adds a section ID and a time stamp to each utterance section. Moreover, an utterance section is a single continuous section in which speech is being uttered. An utterance section is assumed to end before, for example, an occurrence of a non-utterance of 1500 milliseconds or more. Due to this process, conversational speech can be separated into a plurality of pieces of speech data for each speaker and for each utterance section. Hereinafter, speech of an utterance in one utterance section may also be simply referred to as an utterance. FIG. 5 shows respective utterances separated in step S401.

In step S402, the conversation situation analyzing unit 204 calculates utterance feature values (speech feature values) for each utterance. Examples of utterance feature values include a power level of voice, a pitch, a tone, a duration, an utterance speed (an average mora length). A power level of voice indicates a sound pressure level of an utterance. A tone indicates a height of a sound or a sound itself. The height of sound is specified by the number of vibrations (frequency) of sonic waves per second. A pitch indicates a height of perceived sound and is specified by a physical height (basic frequency) of a sound. An average mora length is calculated as a length (period of time) of an utterance per mora. A mora refers to the number of beats. In this case, with respect to a power level of voice, a pitch, a tone, and an utterance speed, favorably, an average value, a maximum value, a minimum value, a variation width, a standard deviation, or the like in an utterance section is obtained. While the utterance feature values described above are to be calculated in the present embodiment, all of the utterance feature values exemplified above need not be calculated and utterance feature values other than those exemplified above may be calculated.

In step S403, the conversation situation analyzing unit 204 obtains an emotion of a speaker for each utterance. Examples of emotions to be obtained include satisfaction, dissatisfaction, excitement, anger, sadness, anticipation, relief, and anxiety. An emotion of a speaker can be obtained based on a change in an utterance feature value such as a change in a power level, a pitch, or a tone of an utterance from a normal state thereof. Utterance feature values during a normal state of each speaker may be derived from previously obtained utterance feature values or information stored in a database 123 of user information and usage history may be used. Moreover, an emotion of a speaker can be obtained based on information other than an utterance feature value. An emotion of a speaker can also be obtained from contents (a text) of an utterance. Alternatively, for example, a facial feature value can be calculated from a facial image of the speaker taken by the camera 113, in which case an emotion of a speaker can be obtained based on the facial feature value.

In step S404, on each utterance, the conversation situation analyzing unit 204 performs a speech recognition process using the speech recognition corpus/dictionary 205 to convert utterance contents into a text. Known techniques may be applied for the speech recognition process. The utterance contents (the text) shown in FIG. 5 are obtained by the process performed in step S404.

In step S405, the conversation situation analyzing unit 204 estimates an intention and a conversation topic of each utterance from the contents (the text) of the utterance by referring to the vocabulary/intention understanding corpus/dictionary 206. Examples of an utterance intention include starting a conversation, making a proposal, agreeing or disagreeing with a proposal, and consolidating opinions. Examples of a conversation topic of an utterance include a category of the utterance, a location, and a matter. Examples of a category of an utterance include eating, travel, music, and weather. Examples of a location brought up as a conversation topic include a place name, a landmark, a store name, and a facility name. The vocabulary/intention understanding corpus/dictionary 206 includes dictionaries of vocabularies respectively used in cases of "starting a conversation, making a proposal, asking a question, voicing agreement, voicing disagreement, consolidating matters", and the like, dictionaries of vocabularies related to "eating, travel, music, weather, and the like" for specifying a category of an utterance, and dictionaries of vocabularies related to "a place name, a landmark, a store name, a facility name, and the like" for specifying a location brought up as a conversation topic. Moreover, when estimating the utterance intention, an emotion of a speaker is favorably taken into consideration in addition to the text of the utterance. For example, when the utterance contents (the text) indicates consent to a proposal, the utterance intention can be estimated in greater detail by taking the emotion of the speaker into consideration such as a case of joyful consent and a case of grudging consent.

As a result of the process of step S405, an intention of a speaker such as "what the speaker wants to do" and a category that is being discussed as a conversation topic can be estimated for each utterance. For example, with respect to a text reading "I'm hungry, so let's get something to eat in Hakone Yumoto" designated by utterance ID2 in FIG. 5, by collating the text with the dictionaries, a category can be estimated as "eating" from the words "let's get something to eat" and "I'm hungry", a location as a conversation topic can be estimated as "Hakone Yumoto" from the word "Hakone Yumoto", and an utterance intention can be estimated as "a proposal" from the word "let's get something to eat".

Moreover, with respect to each utterance shown in FIG. 5, information on a category being brought up as a conversation topic, a location as a conversation topic, and an utterance intention is favorably obtained by also taking information other than contents (a text) of the utterance into consideration. In particular, the utterance intention is also favorably obtained by taking the emotion of the speaker obtained from an utterance feature value or wording into consideration. Even when the utterance contents indicate an agreement to a proposal, utterance feature values enable a distinction to be made between a joyful consent and a grudging consent. Furthermore, depending on the utterance, such information cannot be extracted from the utterance contents (a text). In such a case, the conversation situation analyzing unit 204 may estimate the utterance intention by considering extraction results of intentions and utterance contents (texts) previously and subsequently occurring along a time series.

While an example of a case where an entire speaker group is engaged in a conversation on one conversation topic has been described above, there may be cases where the speaker group is split into a plurality of subgroups and each subgroup is engaged in a different conversation. In order to accommodate such situations, the conversation situation analyzing unit 204 also favorably extracts utterances estimated as being made on a same topic in consideration of the category of each utterance and a time-sequential result of utterances obtained in step S405 and specifies a group of utterances obtained as a result of the extraction as a group of utterances included in the series of conversations. According to this process, utterances included in one conversation from the start to end of the conversation can be specified. In identity determination of a conversation theme, similarities of categories and locations as conversation topics of utterances are taken into consideration. Furthermore, by also taking a temporal relationship among utterances into consideration, different conversation themes may be determined when a time interval between utterances is too long even when the category or the location as the conversation topic of the utterances is the same. Moreover, there may be utterances that do not include words from which an intention or a category can be extracted. In such a case, in consideration of a time-sequential flow of a conversation, utterances by a same speaker occurring between the start and the end of a same conversation may be assumed as being included in a same conversation.

In step S407, the conversation situation analyzing unit 204 generates and outputs conversation situational data that integrates the analysis results described above. Conversation situational data includes, with respect to utterances in a same conversation during a most recent prescribed period, utterance contents (a text), an utterance intention, a relationship among utterances, conversation topics (a category, a location, a matter, or the like) of the utterance, and an emotion for each speaker. Favorably, conversation situational data also includes the number of utterances, an utterance time, a power level of voice, a tone, a pitch, an utterance speed, and the like of each speaker.

FIG. 5B is a diagram showing utterance contents, conversation topics of the utterances, and utterance intentions in conversation situational data of the conversation shown in FIG. 5A. In this manner, an opinion expressed by each speaker regarding decision making including two selective elements, namely, a place to eat and what to eat, can be comprehended from conversation situational data.

<Opinion Hearing Target Person Determining Process>

Figures 6A, 6B:
FIGS. 6A and 6B are diagrams explaining expressed opinions in decision making including a plurality of selective elements and values which may be taken by group satisfaction when a new opinion is obtained.

Next, details of the opinion hearing target person determining process in step S304 in FIG. 3 will be described. FIG. 6A is a diagram showing contents of an opinion by each speaker acquired based on the conversation situational data shown in FIG. 5B with respect to the conversation example shown in FIG. 5A. In decision making regarding where and what to eat for lunch, with respect to the selective element "location", speakers A and C argue for "Goura" while speaker B argues for "Hakone Yumoto". With respect to the selective element "content", while speaker A argues for "soba", speakers B and C have not yet expressed opinions. In such a situation, the intervening/arbitrating unit 209 determines a more favorable option between eliciting an opinion from speaker B and eliciting an opinion from speaker C with respect to the selective element "content".

As shown in FIG. 6B, the intervening/arbitrating unit 209 calculates group satisfaction when assuming that each of the speakers B and C, who have not yet expressed opinions, express expected opinions with respect to this selective element. While details of a method of calculating group satisfaction will be provided later, group satisfaction is an index indicating that, the larger a value of the index, the greater the satisfaction of a group as a whole. The simulation result presented in FIG. 6B shows that, regardless of a response by the target person being "soba" or "other than soba", group satisfaction increases when an opinion is elicited from speaker B. In this manner, the intervening/arbitrating unit 209 can determine a speaker capable of further improving group satisfaction as a target person based on a simulation result with respect to group satisfaction.

Figure 7:
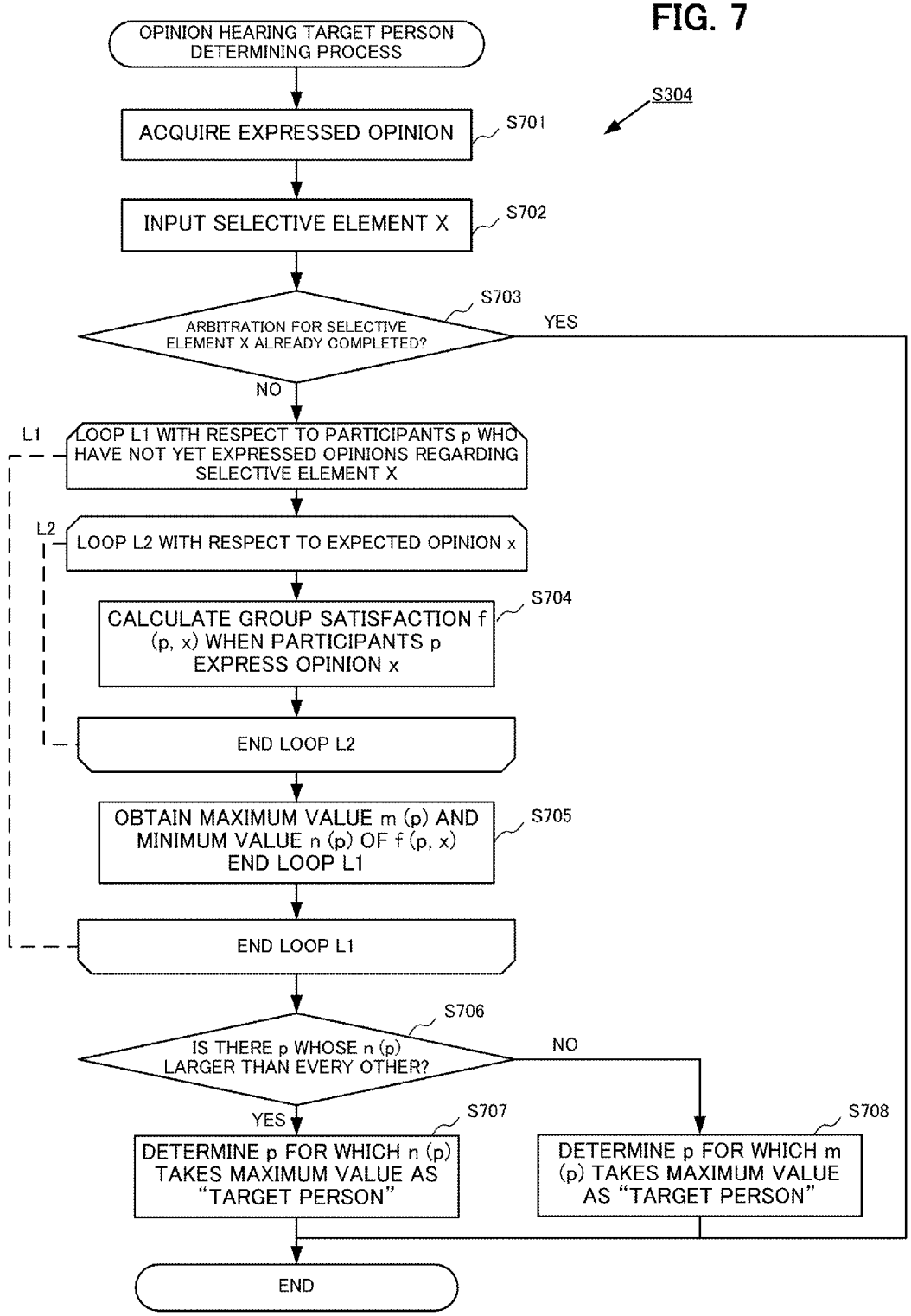
FIG. 7 is a flow chart showing a flow of an opinion hearing target person determining process (S304) in a conversation intervention support method.

Hereinafter, details of the target person determining process will be described with reference to the flow chart in FIG. 7. In step S701, the intervening/arbitrating unit 209 acquires conversation situational data from the conversation situation analyzing unit 204 and acquires an expressed opinion by each speaker (decision making participant) for each of a plurality of selective elements. Moreover, at this point, in addition to contents of the expressed opinions, how the opinions were expressed is also acquired. Modes of expression of opinions include, for example, self-proposing an opinion, explicitly (or joyfully) consenting to an opinion proposed by another participant, and grudgingly consenting to an opinion proposed by another participant.

In step S702, the intervening/arbitrating unit 209 receives input indicating for which selective element a target person is to be determined. The input selective element will be hereinafter referred to as selective element X. In the following description, the selective element X is assumed to be supplied to the intervening/arbitrating unit 209 from the outside.

In step S703, the intervening/arbitrating unit 209 determines whether or not arbitration of opinions among the participants has been completed with respect to the selective element X. Whether or not arbitration of opinions has been completed can be determined by considering whether or not a decision can be made according to prescribed decision criteria based on the expressed opinions. For example, when adopting decision criteria which selects a given opinion as a decided opinion when the opinion has been expressed a threshold number of times (for example, a majority of times) or more, a determination may be made on whether or not there is an opinion expressed by a threshold number (for example, a majority) of participants or more among the expressed opinions. Moreover, when obtaining the number of opinions, the opinions of the respective participants need not necessarily be treated equally. The number of opinions is also favorably obtained by weighting the opinions in accordance with the participants.

When it is determined that arbitration for the selective element X has been completed (S703: Yes), the intervening/arbitrating unit 209 ends the process without determining a target person since a hearing of opinions with respect to the selective element X need not be performed.

When it is determined that arbitration for the selective element X has not been completed (S703: No), the intervening/arbitrating unit 209 performs the following processes. In a process of loop L1, for each participant (denoted as p) who has yet to express an opinion with respect to the selective element X, a maximum value m(p) and a minimum value n (p) of assumed group satisfaction are obtained. Specifically, in loop L2, for each of opinions x which are expected with respect to the selective element X, the intervening/arbitrating unit 209 obtains group satisfaction f (p, x) which is assumed when the participant p expresses the opinions x (S704). The expected opinions x include any of opinions already expressed with respect to the selective element X as well as opinions that differ from the already-expressed opinions.

A method of calculating group satisfaction will now be described. Group satisfaction is calculated based on an opinion adoption score of each participant which is determined based on contents of expression of opinions and decided contents of each participant. An opinion adoption score is calculated as a sum of scores based on a relationship between contents of a self-expressed opinion and whether or not the opinion contents have been adopted with respect to the respective selective elements. FIG. 8A is a diagram showing examples of score definitions. For example, a score when a self-proposed opinion is adopted can be defined as 2 points, a score when an opinion to which a participant explicitly (joyfully) consents is adopted can be defined as 1 point, a score when an opinion to which a participant grudgingly consents is adopted can be defined as −1 point, a score when an opinion to which a participant explicitly consents is not adopted can be defined as −1.5 points, and a score when a self-proposed opinion is not adopted can be defined as −2 points. In addition, a score when an opinion is not expressed with respect to a selective element is defined as 0 points. The definitions listed above are merely examples and the points of each score, classification criteria of scores, and the like may be determined as appropriate.

An opinion adoption score of each participant is a sum of scores with respect to respective selective elements. The example shown in FIG. 8B reveals that scores of participant A with respect to the respective selective elements include 1 point for the selective element 1 since an opinion to which the participant A has consented is adopted and 2 points each for the selective elements 2 and 3 since opinions proposed by the participant A are adopted. Therefore, the opinion adoption score of the participant A is 5 points which is a sum of these scores. With respect to the participant B, since an opinion proposed with respect to the selective element 1 was not adopted (−2 points) and opinions have not been expressed (0 points) for the other selective elements, the opinion adoption score is −2 points. In addition, with respect to the participant C, since an opinion proposed with respect to the selective element 1 was adopted (2 points) and opinions have not been expressed (0 points) for the other selective elements, the opinion adoption score is 2 points.

In the present embodiment, for example, group satisfaction $S_{group}$ is expressed by the following equation.

$$S_{group} = \frac{a}{b} \qquad \text{[Math. 1]}$$
$$a = \sum_m S_m$$
$$b = \sum_m \left( \left( S_m - \frac{a}{N} \right)^2 + 1 \right)$$

In this case, $S_m$ denotes an opinion adoption score of a participant m, N denotes the total number of participants, and a summation (sigma) targets all participants.

As shown in FIG. 8B, when the opinion adoption scores of the respective participants are 5, −2, and 2, group satisfaction can be calculated as 0.18 (=5/27.67).

An index a denotes a sum of opinion adoption scores of the respective participants. An index b can be considered a value related to a dispersion of the opinion adoption scores of the respective participants. Specifically, the index b is a value obtained by adding N to a multiple of the dispersion by N. Regarding a value of the group satisfaction $S_{group}$ described above, the larger the opinion adoption scores of the respective participants, the higher the value, and the smaller a variation among the opinion adoption scores of the respective participants, the higher the value.

Specifically, the intervening/arbitrating unit 209 obtains group satisfaction f (p, x) in a case where a participant p expresses an opinion x with respect to a selective element X as follows. First, based on an expressed opinion and an assumed opinion x of the participant p, an adopted opinion is decided for each selective element. Criteria such as those described above may be adopted as decision criteria of an adopted opinion. Moreover, when neither opinion satisfies the decision criteria, a determination is made with respect to the selective element that an adopted opinion has not been decided.

Once an adopted opinion has been decided for each selective element, the intervening/arbitrating unit 209 calculates an opinion adoption score of each participant and calculates group satisfaction according to the calculation expression described above based on the opinion adoption scores. Moreover, when calculating opinion adoption scores, if an adopted opinion has not been decided (cannot be decided) for a given selective element, all scores related to the selective element may be treated as 0 points.

According to the process of loop L2, assumed group satisfaction f (p, x) is obtained with respect to the participant p for a plurality of cases where it is assumed that an expected opinion x with respect to the selective element X has been expressed. In step S705, the intervening/arbitrating unit 209 obtains and temporarily stores a maximum value m (p) and a minimum value n (p) of the obtained group satisfaction f (p, x).

According to the process of loop L1, a maximum value m (p) and a minimum value n (p) of group satisfaction when opinions are elicited from all participants p who have yet to express an opinion with respect to the selective element X are respectively obtained. In step S706, the intervening/arbitrating unit 209 determines whether or not there is a participant whose minimum value n (p) is larger than the minimum values of all other participants. In other words, when a participant p" denotes a participant other than a participant p', the intervening/arbitrating unit 209 determines whether or not there is a participant p' satisfying n (p')>n (p") for all p".

When the determination in step S706 results in a positive determination or, in other words, when there is a participant whose minimum value n (p) is an independently maximum value (S706: Yes), the intervening/arbitrating unit 209 determines this participant as a target person (S707).

When the determination in step S706 results in a negative determination or, in other words, when there is no participant whose minimum value n (p) is an independently maximum value (S706: No), the intervening/arbitrating unit 209 determines a participant for which the maximum value m (p) takes a maximum value as a target person (S708). Moreover, when there are a plurality of participants for which the maximum value m (p) takes a maximum value, a target person may be determined from the plurality of participants according to prescribed criteria (for example, at random, a person with a large/small number of expressed opinions, and a person whose priority set in advance is high).

For example, when group satisfaction such as that shown in FIG. 6B is obtained, the minimum value n (p) of 0.09 is the same regardless of which of participant B or C is selected as the target person and a participant whose minimum value n (p) is an independently maximum value does not exist. Therefore, the participant B for which the maximum value m (p) takes a maximum value is determined as the target person.

Advantageous Effects of the Present Embodiment

According to the present embodiment, group satisfaction that is calculated based on contents of opinions expressed by respective participants and on actually-decided contents is introduced, group satisfaction in a case where it is assumed that participants who have not yet expressed opinions have expressed an expected opinion, and a determination is made regarding from which participant an opinion is to be elicited based on the group satisfaction. Therefore, an opinion can be elicited from a participant who increases group satisfaction. In particular, since a participant who causes a minimum value of group satisfaction to increase is determined as a target person, an opinion can be elicited so as to further increase group satisfaction.

In addition, group satisfaction according to the present embodiment is defined so as to have a high value when opinions of the respective participants are evenly adopted. When a simple summation of satisfaction of the respective participants is used as group satisfaction, while high group satisfaction may sometimes end up being calculated even when opinions of only a part of the participants are adopted, participants whose opinions are not adopted may become frustrated. In the present embodiment, since opinions of the respective participants are evenly adopted, the group satisfaction described above is appropriate as an index representing satisfaction when a plurality of participants engage in decision making including a plurality of selective elements.

<Modifications>

[Modification of Group Satisfaction]

As long as group satisfaction is defined so that the larger the sum of the opinion adoption scores of the respective participants, the higher the group satisfaction, and the smaller a variation among the opinion adoption scores of the respective participants, the higher the group satisfaction, a specific definition of group satisfaction is not particularly limited. Moreover, as a measure of variation, a dispersion, a standard deviation, a summation of absolute values of differences from an average value, a difference between a maximum value and a minimum value, and the like can be adopted. In the description given above, while group satisfaction is defined as a value obtained by dividing a value a related to a sum of opinion adoption scores by a value b related to a variation among the opinion adoption scores, alternatively, group satisfaction may be defined as a value obtained by subtracting the value b from the value a after respectively appropriately scaling the values a and b.

In the description given above, group satisfaction is described as being obtained based on a comparison between expressed opinions and decided contents with respect to each selective element including in given decision making. In other words, when obtaining group satisfaction with respect to given decision making, expressed opinions regarding previous decision making are not taken into consideration. However, group satisfaction is also favorably obtained by considering how much expressed opinions were adopted with respect to previous decision making. With the method according to the embodiment described above, although opinions of the respective participants can be evenly adopted to the greatest extent feasible, a variation cannot be completely prevented from occurring in adoption situations of the opinions. Therefore, when a plurality of decision making sessions are considered, a significant variation may conceivably occur in the adoption situations of opinions. By also considering the adoption situation of opinions with respect to previous decision making, a long-term adoption situation of opinions can be leveled and satisfaction of all group members can be improved.

In addition, in the description given above, group satisfaction is described as being obtained based on a comparison between expressed opinions and a decided content. However, there may be cases where a person may eventually feel satisfied by a result of action taken according to decided contents even though the person's own opinion was not adopted or, conversely, there may be cases where a person may feel dissatisfied by a result of action taken according to decided contents even though the person's own opinion was adopted. This can be determined by, for example, analyzing opinions of the respective participants which are voiced after an action is taken according to the decided content. For example, when a person argues for soba for lunch but a decision is made to eat something else, when the person voices a positive opinion regarding lunch afterwards, a determination can be made that the person is satisfied with the contents of the action (the decided contents). As described above, when obtaining group satisfaction by also taking previous decision making into consideration, group satisfaction is favorably obtained by considering satisfaction with respect to a result of such actions. Moreover, when reflecting previous decision making and situations such as a result of actions in satisfaction, it is also favorable to assign greater weight to more recent events.

For example, as shown in FIG. 9A, scores on results of actions with respect to previous decision making are introduced. What kind of score is to be assigned to each situation and what kind of situation is to be assumed are not particularly limited. FIG. 9B is a diagram showing an example of calculating group satisfaction by taking into consideration scores that consider results of actions with respect to previous decision making and scores based on an opinion adoption situation (predicted) of current decision making. With the exception of including assessment of previous decision making (results of actions), the method of calculating group satisfaction is similar to the method explained in the embodiment described above. However, in order to reduce the effect of previous decision making, it is also favorable to obtain group satisfaction by assigning weight coefficients such that the longer the period of time having lapsed from decision making, the smaller the weight coefficient given to the score of the decision making. By also taking into consideration assessment of previous decision making, opinions of respective participants can be evenly adopted throughout a plurality of decision making sessions and satisfaction of all group members can be improved.

Moreover, while a score that combines adoption situations of opinions and satisfaction with respect to results of actions is adopted for previous decision making in the example shown in FIGS. 9A and 9B, the opinion adoption situations and the results of actions may be respectively assessed as separate scores or only the results of actions may be assessed.

[Modification of Opinion Hearing Target Person Determining Method]

After obtaining group satisfaction when assuming that an expected opinion is expressed with respect to all participants p who have not yet expressed opinions regarding a selective element X, a target person may be determined by methods other than that described above. In the description given above, when there is a participant p whose minimum value n (p) is larger than minimum values of all other participants, the participant p is determined as the target person. In addition, when such a participant does not exist, a participant for which the maximum value m (p) takes a maximum value is determined as the target person. However, a participant for which the maximum value m (p) takes a maximum value may be determined as the target person in the first place. In addition, when a participant for which the minimum value n (p) takes a maximum value exists in plurality, a participant for which the maximum value m (p) takes a maximum value among these participants may be determined as the target person. In a similar manner, when a participant for which the maximum value m (p) takes a maximum value exists in plurality, a participant for which the minimum value takes a maximum value among these participants may be determined as the target person.

Furthermore, while one target person is to be determined in the description given above, priorities of target persons from which opinions are to be elicited may be obtained based on assumed group satisfaction, in which case opinions may be sequentially elicited starting from participants with higher priorities. For example, conceivably, an intervention is performed for eliciting an opinion from a participant with a highest priority, and when an opinion cannot be elicited from this participant, an intervention is performed for eliciting an opinion from a participant with a next highest priority. Alternatively, conceivably, an intervention may be performed for eliciting opinions from a plurality of participants with high priorities. When determining a priority, for example, the larger the minimum value n (p) in step S707, the higher the priority to be determined, or the larger the maximum value m (p) in step S708, the higher the priority to be determined.

[Determination of Selective Element of Opinion Hearing Target Person]

A description in which the selective element X that is posed as a question in order to elicit an opinion is input from the outside has been given above. However, the intervening/arbitrating unit 209 may determine the selective element X that is posed as a question in order to elicit an opinion. In this case, the processes of steps S703 to S705 may be performed on all selective elements, and a target person and contents to be posed as a question may be determined based on assumed group satisfaction that is obtained for each selective element, for each processing unit, and for each expected opinion. For example, a target person is determined for each selective element and, when doing so, a maximum value and a minimum value of group satisfaction are obtained. Subsequently, which selective element is to be posed as a question in order to elicit an opinion may be determined based on the maximum value and the minimum value of group satisfaction for each selective element.

[Modification of Applicable System]

While an example of a conversation intervention support system being configured as a telematics service in which a vehicle and a server device cooperate with each other has been described above, a specific mode of the system is not limited thereto. For example, the system can be configured so as to acquire a conversation taking place indoors such as in a conference room and to intervene in the conversation.

EXAMPLES

The present invention can be implemented by a combination of software and hardware. For example, the present invention can be implemented as an information processing device (a computer) including a processor such as a central processing unit (CPU) or a micro processing unit (MPU) and a non-transitory memory that stores a computer program, in which case the functions described above are provided as the processor executes the computer program. Alternatively, the present invention can be implemented with a logic circuit such as an application specific integrated circuit (ASIC) or a field programmable gate array (FPGA). Further alternatively, the present invention can be implemented using both a combination of software and hardware and a logic circuit. In the present disclosure, a processor configured so as to realize a specific function and a processor configured so as to function as a specific module refer to both a CPU or an MPU which executes a program for providing the specific function or a function of the specific module and an ASIC or an FPGA which provides the specific function or a function of the specific module.

What is claimed is:

1. A decision making support device supporting decision making including a plurality of selective elements, the decision making support device comprising a processor configured to operate as:
    an opinion acquiring module that acquires an expressed opinion from each of a plurality of participants with respect to each of the plurality of selective elements; and
    a target person determining module that determines, with respect to a given selective element, from which participant an opinion on the selective element is to be elicited when there are a plurality of unexpressed participants who have not yet expressed opinions on the selective element,
    wherein the target person determining module
    respectively calculates, when assuming that each of the unexpressed participants has expressed any of expected opinions, assumed group satisfaction that is determined based on contents of decision making and contents of expression of opinions of the plurality of participants,
    determines from which participant an opinion on the selective element is to be elicited based on the assumed group satisfaction,
    obtains, for each of the unexpressed participants, a minimum value of assumed group satisfaction when assuming that any of expected opinions is expressed, and
    when there is an unexpressed participant for which a minimum value of the assumed group satisfaction becomes larger than any of minimum values of the assumed group satisfaction of other unexpressed participants, determines to elicit an opinion from the unexpressed participant.

2. The decision making support device according to claim 1,
    wherein the target person determining module obtains, for each of the unexpressed participants, a maximum value of assumed group satisfaction when assuming that any of the expected opinions is expressed, and
    wherein, when there is no unexpressed participant for which a minimum value of the assumed group satisfaction becomes larger than any of minimum values of the assumed group satisfaction of other unexpressed participants, the target person determining module determines to elicit an opinion from an unexpressed participant for which the maximum value of the assumed group satisfaction is largest.

3. The decision making support device according to claim 1,
    wherein the target person determining module obtains, for each of the unexpressed participants, a maximum value of assumed group satisfaction when assuming that any of expected opinions is expressed, and
    wherein when there is an unexpressed participant for which a maximum value of the assumed group satisfaction becomes larger than any of maximum values of the assumed group satisfaction of other unexpressed participants, the target person determining module determines to elicit an opinion from the unexpressed participant.

4. The decision making support device according to claim 1, wherein the assumed group satisfaction is calculated such that, the larger a sum of opinion adoption scores representing to what degree opinions of the respective participants have been reflected in decision making, the higher the assumed group satisfaction, and the smaller a variation among the opinion adoption scores, the higher the assumed group satisfaction.

5. The decision making support device according to claim 4, wherein the assumed group satisfaction is calculated as a value that is respectively proportional to a sum of the opinion adoption scores and to a reciprocal of a variation among the opinion adoption scores.

6. The decision making support device according to claim 1, wherein the expected opinions with respect to the selective element include one of expressed opinions with respect to the selective element and opinions that differ from the expressed opinions.

7. The decision making support device according to claim 1, wherein the opinion acquiring module includes:
    an acquiring module that acquires conversational speech by the plurality of participants;
    a separating module that separates an utterance of each participant from the conversational speech; and
    a recognizing module that recognizes, from the utterance of each participant, utterance contents using a speech recognition process.

8. A computer-implemented method of supporting decision making including a plurality of selective elements, the method comprising:
    an opinion acquiring step in which an expressed opinion is acquired from each of a plurality of participants with respect to each of the plurality of selective elements; and
    a target person determining step in which, with respect to a given selective element, a determination is made regarding from which participant an opinion on the selective element is to be elicited when there are a plurality of unexpressed participants who have not yet expressed opinions on the selective element, wherein
    in the target person determining step,
    when assuming that each of the unexpressed participants has expressed any of expected opinions, assumed group satisfaction that is determined based on contents of decision making and contents of expression of opinions of the plurality of participants are respectively calculated,
    a determination is made regarding from which participant an opinion on the selective element is to be elicited based on the assumed group satisfaction,
    obtaining, for each of the unexpressed participants, a minimum value of assumed group satisfaction when assuming that any of expected opinions is expressed, and
    when there is an unexpressed participant for which a minimum value of the assumed group satisfaction becomes larger than any of minimum values of the assumed group satisfaction of other unexpressed participants, determining to elicit an opinion from the unexpressed participant.

9. A decision making support device supporting decision making including a plurality of selective elements, the decision making support device comprising a processor configured to operate as:
- an opinion acquiring module that acquires an expressed opinion from each of a plurality of participants with respect to each of the plurality of selective elements; and
- a target person determining module that determines, with respect to a given selective element, from which participant an opinion on the selective element is to be elicited when there are a plurality of unexpressed participants who have not yet expressed opinions on the selective element, wherein the target person determining module
respectively calculates, when assuming that each of the unexpressed participants has expressed any of expected opinions, assumed group satisfaction that is determined based on contents of decision making and contents of expression of opinions of the plurality of participants,
determines from which participant an opinion on the selective element is to be elicited based on the assumed group satisfaction,
obtains, for each of the unexpressed participants, a maximum value of assumed group satisfaction when assuming that any of expected opinions is expressed, and
when there is an unexpressed participant for which a maximum value of the assumed group satisfaction becomes larger than any of maximum values of the assumed group satisfaction of other unexpressed participants, determines to elicit an opinion from the unexpressed participant.

10. The decision making support device according to claim 9,
wherein the target person determining module obtains, for each of the unexpressed participants, a minimum value of assumed group satisfaction when assuming that any of expected opinions is expressed, and
wherein, when there is an unexpressed participant for which a minimum value of the assumed group satisfaction becomes larger than any of minimum values of the assumed group satisfaction of other unexpressed participants, the target person determining module determines to elicit an opinion from the unexpressed participant.

11. The decision making support device according to claim 10,
wherein the target person determining module obtains, for each of the unexpressed participants, a maximum value of assumed group satisfaction when assuming that any of the expected opinions is expressed, and
wherein, when there is no unexpressed participant for which a minimum value of the assumed group satisfaction becomes larger than any of minimum values of the assumed group satisfaction of other unexpressed participants, the target person determining module determines to elicit an opinion from an unexpressed participant for which the maximum value of the assumed group satisfaction is largest.

12. The decision making support device according to claim 9, wherein the assumed group satisfaction is calculated such that, the larger a sum of opinion adoption scores representing to what degree opinions of the respective participants have been reflected in decision making, the higher the assumed group satisfaction, and the smaller a variation among the opinion adoption scores, the higher the assumed group satisfaction.

13. The decision making support device according to claim 12, wherein the assumed group satisfaction is calculated as a value that is respectively proportional to a sum of the opinion adoption scores and to a reciprocal of a variation among the opinion adoption scores.

14. The decision making support device according to claim 9, wherein the expected opinions with respect to the selective element include one of expressed opinions with respect to the selective element and opinions that differ from the expressed opinions.

15. The decision making support device according to claim 9, wherein the opinion acquiring module includes:
- an acquiring module that acquires conversational speech by the plurality of participants;
- a separating module that separates an utterance of each participant from the conversational speech; and
- a recognizing module that recognizes, from the utterance of each participant, utterance contents using a speech recognition process.

* * * * *

UNITED STATES PATENT AND TRADEMARK OFFICE
CERTIFICATE OF CORRECTION

PATENT NO. : 10,592,997 B2
APPLICATION NO. : 15/190196
DATED : March 17, 2020
INVENTOR(S) : Junichi Ito et al.

Page 1 of 1

It is certified that error appears in the above-identified patent and that said Letters Patent is hereby corrected as shown below:

On the Title Page

Item (73) The Assignee (Column 1, Line 19), should include --Inter-University Research Institute Corporation Research Organization of Information and Systems, Tokyo (JP)-- as a second assignee.

Signed and Sealed this
First Day of December, 2020

Andrei Iancu
*Director of the United States Patent and Trademark Office*